United States Patent

Kanehara et al.

[11] Patent Number: 5,800,298
[45] Date of Patent: Sep. 1, 1998

[54] METAL V-BELT TYPE CONTINUOUSLY VARIABLE TRANSMISSION

[75] Inventors: Shigeru Kanehara; Hideaki Yoshida; Hirofumi Akagi; Hideaki Aoyama; Takamichi Shimada, all of Wako, Japan

[73] Assignee: Honda Giken Kogyo Kabushiki Kaisha, Tokyo, Japan

[21] Appl. No.: 818,792

[22] Filed: Mar. 14, 1997

[30] Foreign Application Priority Data

Mar. 27, 1996 [JP] Japan .................. 8-071995

[51] Int. Cl.$^6$ .................. F16H 55/56
[52] U.S. Cl. .................. 474/8; 474/17
[58] Field of Search .................. 474/8, 17, 24, 474/166, 237, 242

[56] References Cited

U.S. PATENT DOCUMENTS

| | | | |
|---|---|---|---|
| 4,380,444 | 4/1983 | Dolza | 474/21 |
| 4,673,379 | 6/1987 | Ohzono et al. | 474/28 |
| 4,810,237 | 3/1989 | Mantovaara | 474/166 |
| 4,941,863 | 7/1990 | Sampei et al. | 474/33 |
| 5,328,412 | 7/1994 | Durum | 474/8 |

FOREIGN PATENT DOCUMENTS

| | | |
|---|---|---|
| 0 000 802A1 | 2/1979 | European Pat. Off. . |
| 0 483 764A1 | 5/1992 | European Pat. Off. . |
| 4-4165149 | 6/1992 | Japan . |
| 5-196093 | 8/1993 | Japan . |

OTHER PUBLICATIONS

Patent Abstracts of Japan, unexamined applications, M Field, vol. 12, No. 31, Jan. 29, 1988, The Patent Office Japanese Government, p. 28 M 663; & JP-A-62 184 270.

Primary Examiner—Thomas R. Hannon
Attorney, Agent, or Firm—Nikaido, Marmelstein, Murray & Oram LLP

[57] ABSTRACT

In a metal V-belt type continuously variable transmission having a driving pulley and a driven pulley, the inclination angle $\alpha$ of a V-groove in the pulleys is set in a range represented by $\tan^{-1} \mu a < \alpha < \tan^{-1} \mu s$, wherein $\mu s$ represents the static friction coefficient between the pulley and an endless belt, and $\mu a$ represents the dynamic friction coefficient between the pulley and the endless belt. In a conventional metal V-belt type continuously variable transmission, the inclination angle $\alpha$ is set in a range represented by $\alpha > \tan^{-1} \mu s$. If the transmittable torque Tin is increased, the tensile force of the endless belt is increased to produce slipping between the endless belt and the pulley. However, according to the present invention, by decreasing the inclination angle $\alpha$ to reduce the tensile force of the endless belt, the transmittable torque Tin can be increased while preventing slipping of the endless belt.

5 Claims, 14 Drawing Sheets

FIG. 4
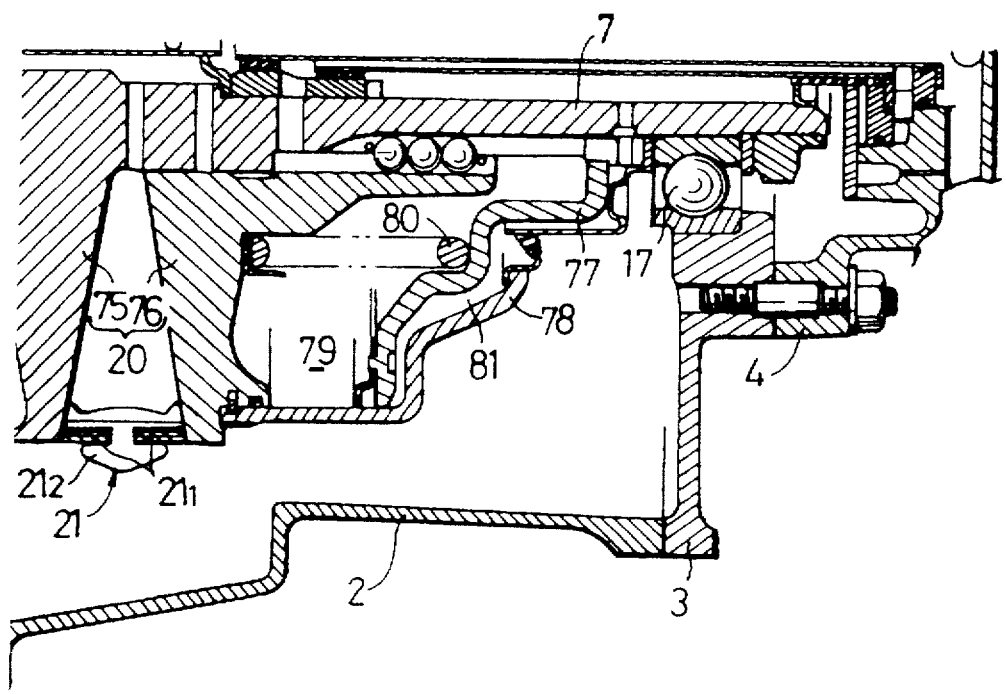
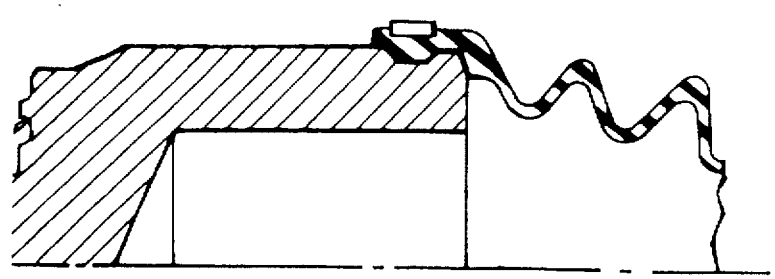

METAL V-BELT TYPE CONTINUOUSLY VARIABLE TRANSMISSION

BACKGROUND OF THE INVENTION

1. Field of the Invention

The present invention relates to a metal V-belt type continuously variable transmission including an endless belt which has a large number of metal blocks mounted on a metal ring and which is reeved around a driving pulley carried on a driving shaft and a driven pulley carried on a driven shaft.

2. Description of the Related Art

A conventional metal V-belt type continuously variable transmission generally includes a starting clutch on a driving shaft. During stoppage of a vehicle with the star ting clutch being in its disengaged state, the driving pulley and the driven pulley are in their stopped states in which the transmission of a power from an engine is blocked. Therefore, if the vehicle is stopped in a state in which the ratio of the belt-type continuously variable transmission is not completely returned to a low value due to a hard braking, it is necessary to shift when the driving pulley and the driven pulley have been stopped, and the ratio is returned to the low value to provide for a next starting. For such shifting, there is a problem that an extremely large hydraulic pressure is required.

If the starting clutch is provided on the driven shaft as described in Japanese Patent Application Laid-Open No. 4-165149, the driving pulley and the driven pulley are in rotation even during stoppage of the vehicle with the starting clutch being in its disengaged state. Therefore, it is possible to perform shifting with a small hydraulic pressure and thereby reduce the capacity of an oil pump.

To apply an axial thrust force to the pulleys of the metal V-belt type continuously variable transmission with hydraulic pressure to move the endless belt radially outwards, it is necessary to establish a given magnitude relationship between the friction coefficient μ between the pulley and the endless belt and the inclination angle α of a V-groove in the pulley.

SUMMARY OF THE INVENTION

Accordingly, it is an object of the present invention to increase the transmittable torque of the metal V-belt continuous transmission by considering the relationship between the friction coefficient μ and the inclination angle α.

To achieve the above object, according to a first aspect and feature of the present invention, there is provided a metal V-belt type continuously variable transmission including an endless belt which has a large number of metal blocks mounted on a metal ring and which is reeved around a driving pulley carried on a driving shaft and a driven pulley carried on a driven shaft, wherein the inclination angle α of V-grooves in the driving pulley and the driven pulley is set in a range represented by $$\tan^{-1} \mu_a < \alpha < \tan^{-1} \mu_s$$

wherein $\mu_s$ represents a static friction coefficient between the driving pulley and the driven pulley and the endless belt, and $\mu_a$ represents a dynamic friction coefficient between the driving pulley and the driven pulley and the endless belt.

With such an arrangement, the pulley inclination angle can be decreased to reduce the tensile force of the endless belt and hence, the transmittable torque can be increased while avoiding slipping of the endless belt. In addition, the stroke of the pulley with respect to the same variation in ratio is reduced and hence, the axial dimension of the metal V-belt continuously variable transmission can be reduced in cooperation with the fact that the axial thickness of the pulley itself is decreased, and also the responsiveness to the variation in ratio can be enhanced.

To achieve the above object, according to a second aspect and feature of the present invention, in addition to the first feature, there is provided a metal V-belt type continuously variable transmission in which the driven shaft is connected to a follower member through a clutch.

With the above arrangement, the clutch is provided on the driven shaft and hence, even with the clutch being in its disengaged state, the driving pulley and the driven pulley can be easily rotated, so that the friction coefficient between the pulley and the endless belt can be a dynamic friction coefficient. Thus, it is possible to achieve a shifting only by applying a small axial thrust force to the pulley to thereby reduce the capacity of an oil pump, to reduce the size of the metal V-belt continuously variable transmission and to provide an enhancement in efficiency by a decrease in load.

The above and other objects, features and advantages of the invention will become apparent from the following description of the preferred embodiment taken in conjunction with the accompanying drawings.

BRIEF DESCRIPTION OF THE DRAWINGS

FIG. 4 is an enlarged view of a portion C shown in FIG. 1;

DETAILED DESCRIPTION OF THE PREFERRED EMBODIMENT

The present invention will now be described by way of preferred embodiments with reference to the accompanying drawings.

First, the entire structure of a belt-type continuously variable transmission will be described with reference to FIGS. 1 to 7.

Figure 1:
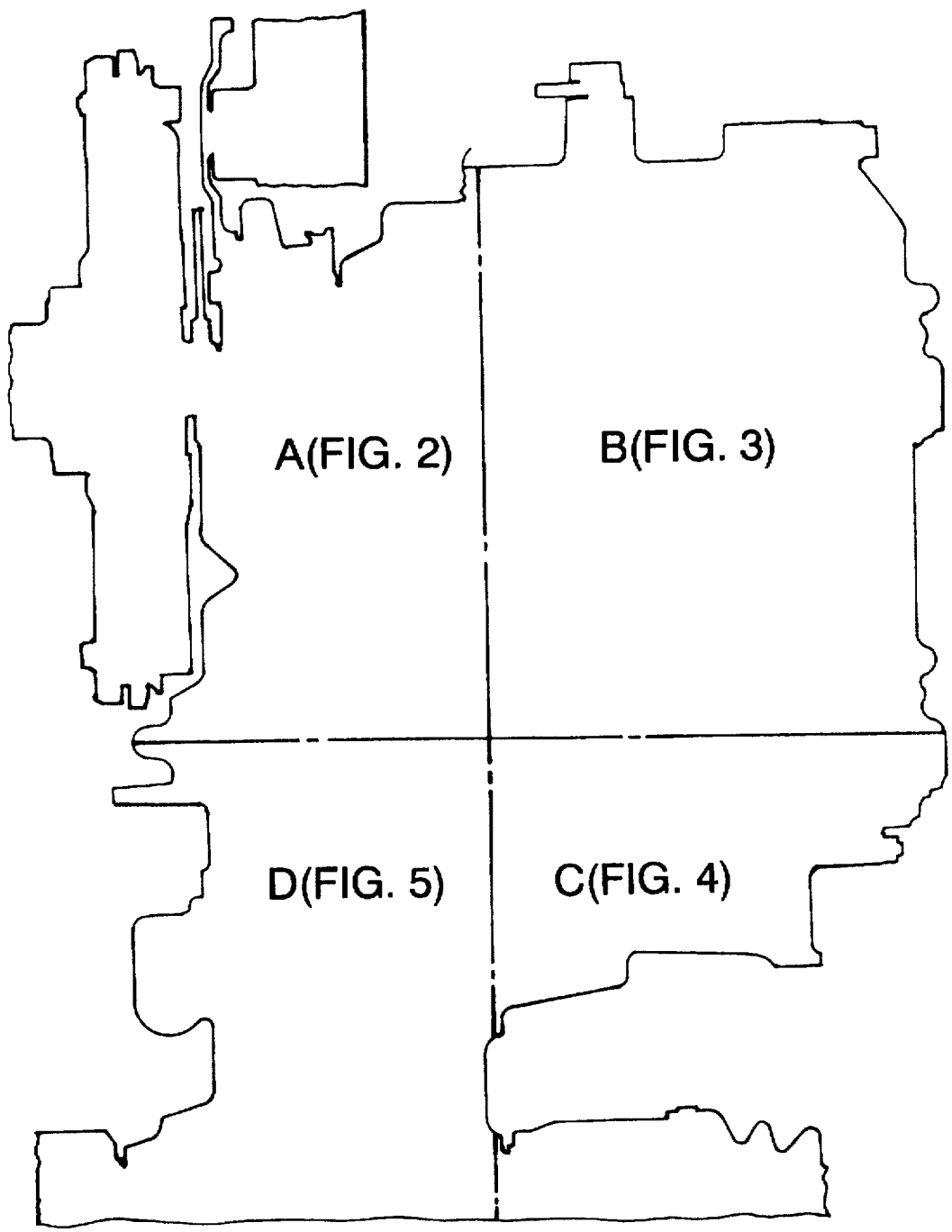
FIG. 1 is a layout of a vertical sectional view of a belt-type continuous transmission.
Figure 2:
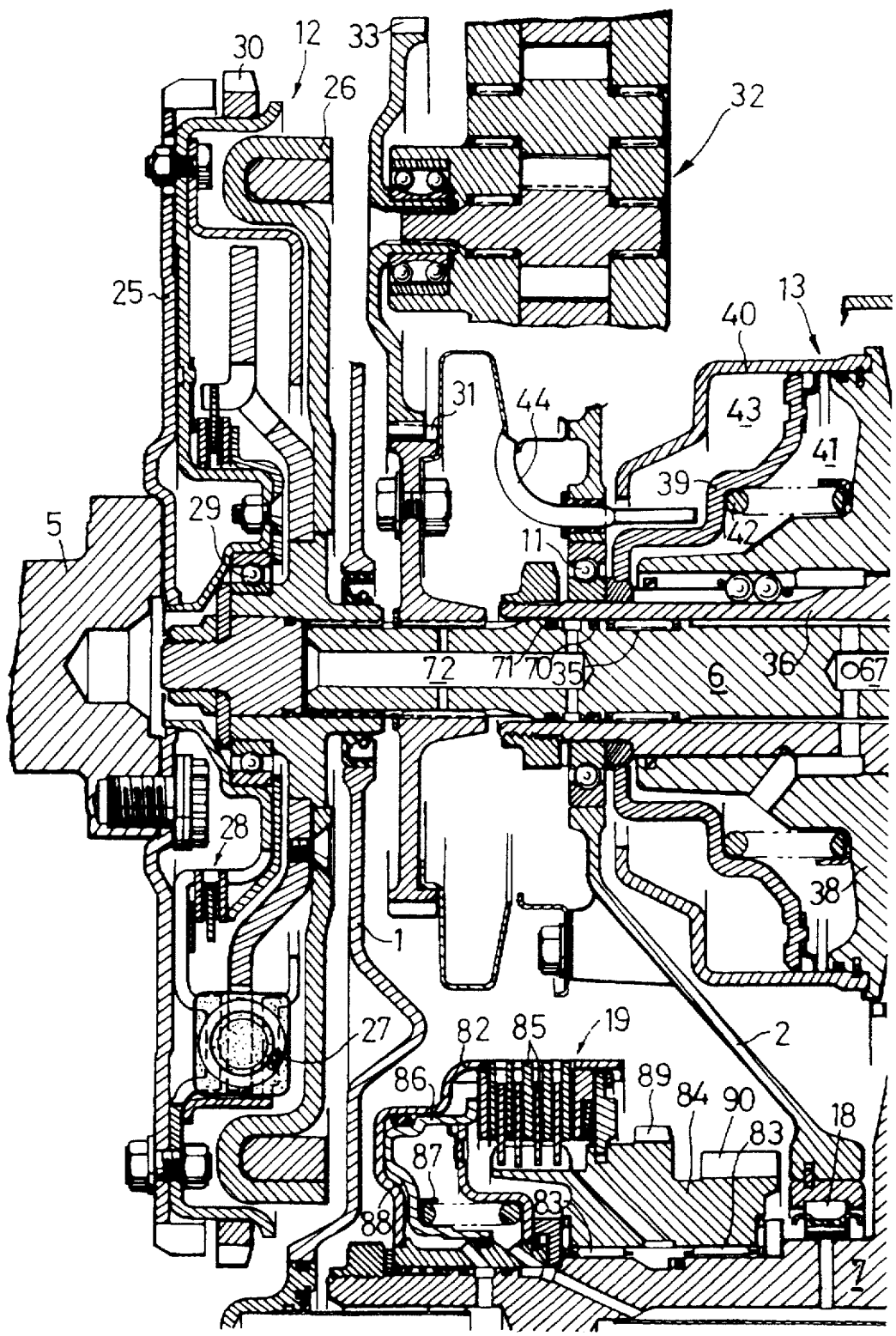
FIG. 2 is an enlarged view of a portion A shown in FIG. 1.
Figure 3:
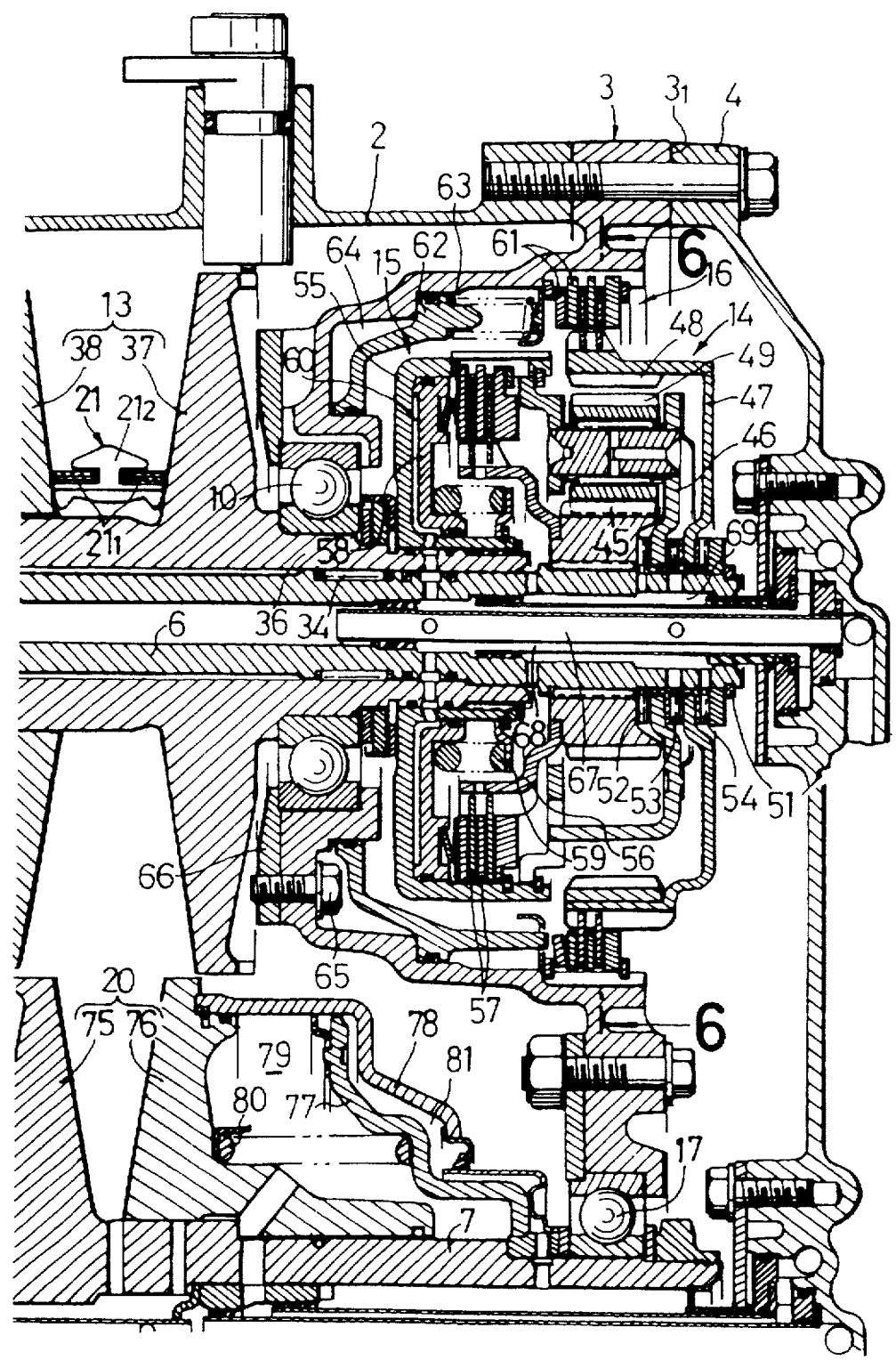
FIG. 3 is an enlarged view of a portion B shown in FIG. 1.
Figure 5:
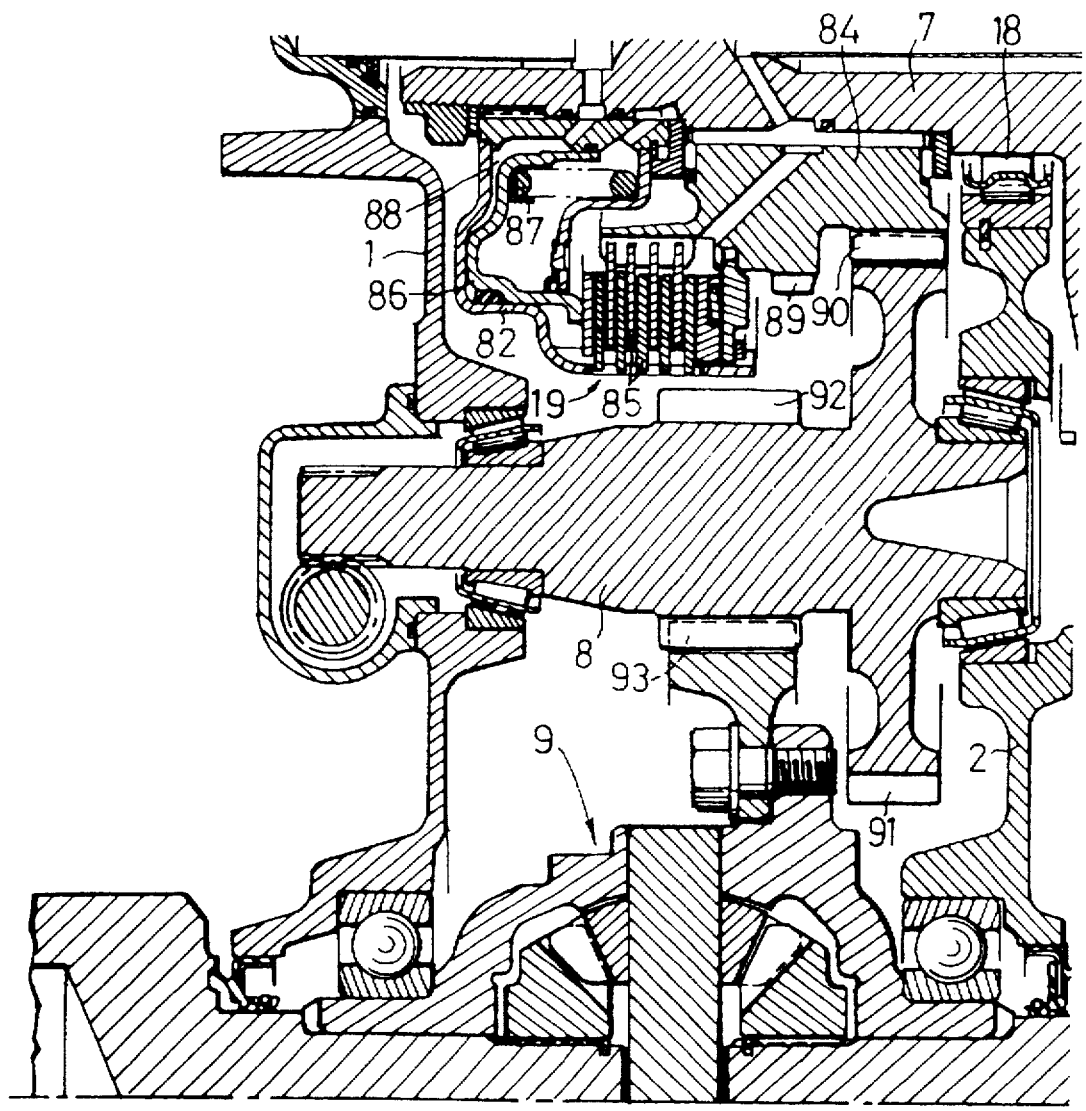
FIG. 5 is an enlarged view of a portion D shown in FIG. 1.
Figure 6:
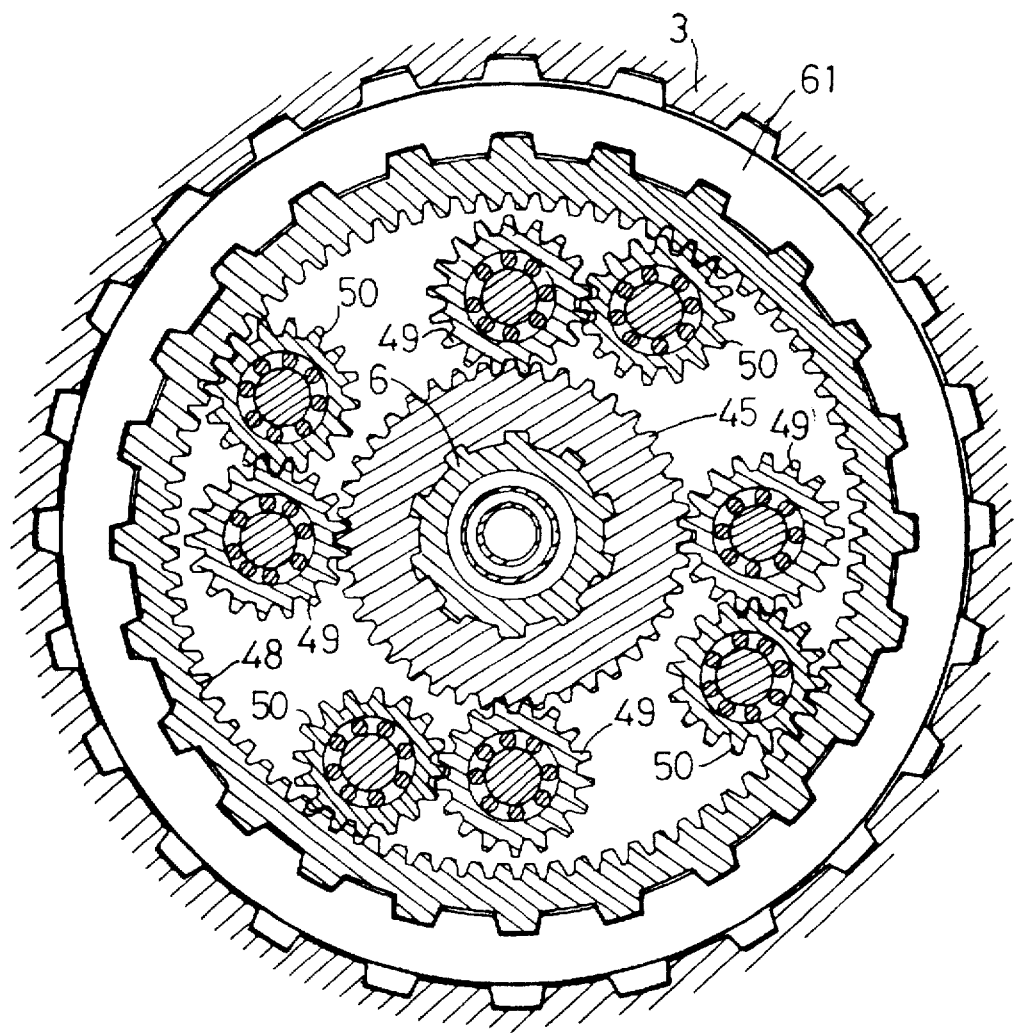
FIG. 6 is a sectional view taken along a line 6—6 in FIG. 3.
Figure 7:
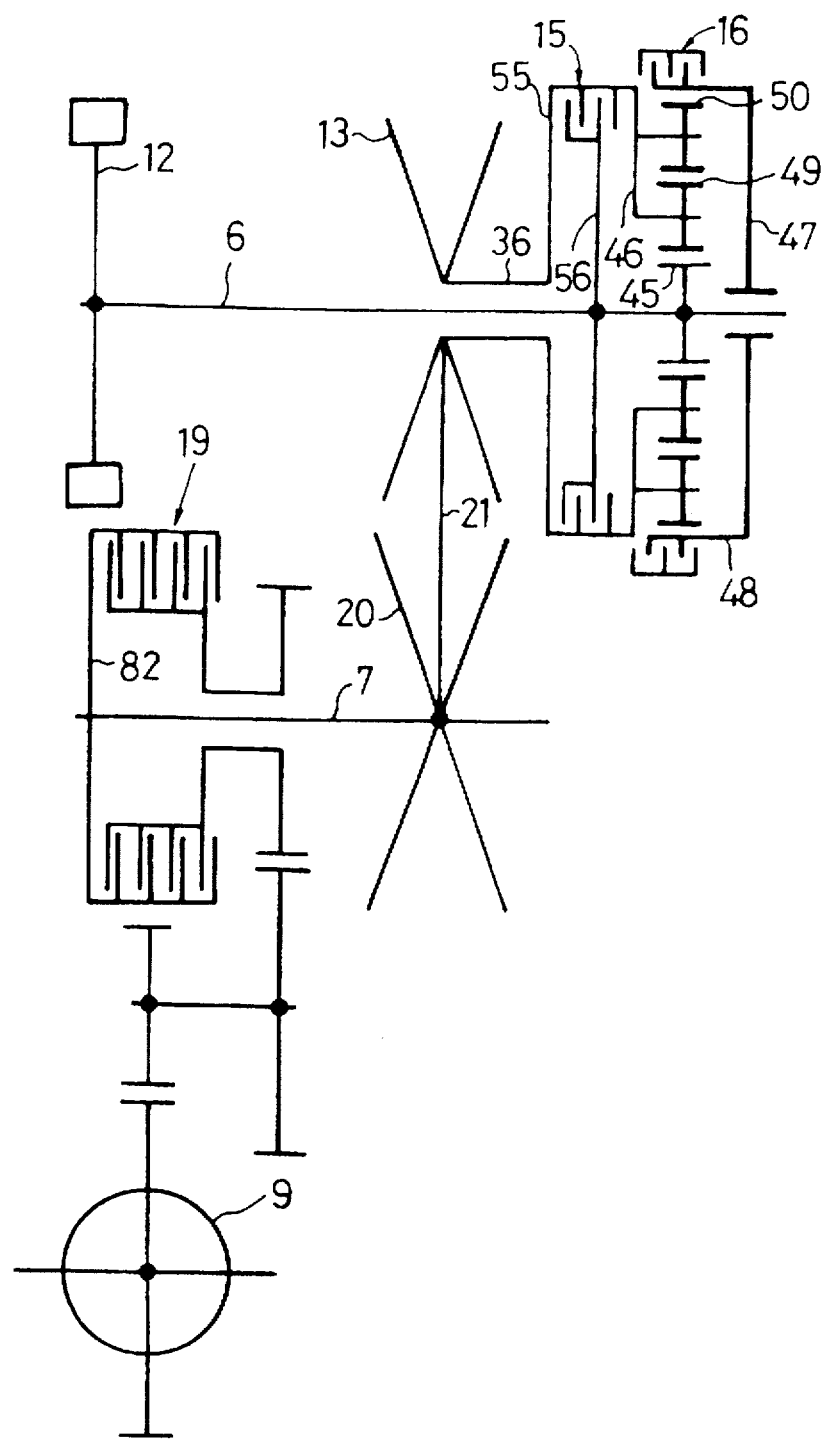
FIG. 7 is a schematic view of the belt-type continuous transmission.

The belt-type continuously variable transmission is connected on its left side (as shown in FIG. 1) to an engine horizontally disposed at a front portion of a vehicle body, and includes a left casing 1 and a right casing 2 coupled to each other through a split surface extending in the longitudinal direction of the vehicle body. A narrower intermediate casing 3 and a right cover 4 are coupled in a superposed manner to a right side of the right casing 2. The belt-type continuously variable transmission includes a driving shaft 6 disposed coaxially with a crankshaft 5 of the engine, a driven shaft 7 disposed below and to the rear of the driving shaft 6, and a secondary shaft 8 disposed below and to the rear of the driven shaft 7. A differential 9 is disposed substantially below the secondary shaft 8.

The driving shaft 6 is supported by a ball bearing 10 mounted in the intermediate casing 3 and a ball bearing 11 mounted in the right casing 2, and is connected at its left end to a right end of the crankshaft 5 through a flywheel 12. A driving pulley 13 is mounted at an intermediate portion of the driving shaft 6, and a forward and backward travel switch-over mechanism is mounted at the right end of the driving shaft 6 and comprises a planetary gear-type reducing mechanism 14, a forward clutch 15 and a reverse brake 16.

The driven shaft 7 is supported by a ball bearing 17 mounted in the intermediate casing 3 and a ball bearing 18 mounted in the right casing 2, and includes a starting clutch 19 at its left end, which is comprised of a wet multi-plate type clutch having a high cooling performance, and a driven pulley 20 at its intermediate portion. The driving pulley 13 of the driving shaft 6 and the driven pulley 20 of the driven shaft 7 are connected to two metal rings $21_1$, $21_1$ by an endless belt 21 which is provided with a large number of metal blocks $21_2$.

The flywheel 12 includes a disk-like first mass 25 secured to the right end of the crankshaft 5, a disk-like second mass 26 secured to the left end of the driving shaft 6 and opposed to the first mass 25, a plurality of springs 27 disposed between the first and second masses 25 and 26 and compressed by the relative rotation of the masses 25 and 26, and a friction force generating means 28 for generating a friction force by the relative rotation of the masses 25 and 26. A ball bearing 29 is mounted between the first and second masses 25 and 26 for supporting the masses 25 and 26 for relative rotation. A starter gear 30 is provided around an outer periphery of the first mass 25 and meshed with a pinion of a starter motor which is not shown.

A first oil pump driving gear 31 is secured to the left end of the driving shaft 6 and meshed with a second oil pump driving gear 33 which is secured to an input shaft of an oil pump 32 consisting of a circumscribing gear pump. Thus, the oil pump 32 is driven by the rotation of the driving shaft 6.

The driving pulley 13 mounted on the driving shaft 6 includes a stationary pulley half 37 integral with a sleeve shaft 36 which is relatively rotatably carried on an outer peripheral surface of the driving shaft 6 with a pair of needle bearings 34 and 35 interposed therebetween, and a movable pulley half 38 slidably carried on an outer periphery of the sleeve shaft 36 through a ball spline and movable toward and away from the stationary pulley half 37. An oil chamber 41 for urging the movable pulley half 38 toward the stationary pulley half 37 is defined by three components: a partition member 39 secured to the sleeve shaft 36, a partition member 40 secured to the movable pulley half 38, and the movable pulley half 38. A spring 42 is mounted under compression in the oil chamber 41 for applying a predetermined initial load to the endless belt 21.

A canceler 43 is defined between the partition member 39 of the sleeve shaft 36 and the partition member 40 of the movable pulley half 38 and is opposed to the oil chamber 41 with the partition member 39 interposed therebetween. An outlet end of a feed pipe 44 for feeding oil from the oil pump 32 opens directly into an inner peripheral portion of the canceler 43. Thus, by feeding the oil from the oil pump 32 through the feed pipe 44 directly to the canceler 43, a guide member required in the prior art for guiding the oil can be eliminated to provide a decrease in the number of parts. Unnecessary thrust force is prevented from being applied to the movable pulley half 38 by allowing the centrifugal force acting on the oil supplied into the canceler 43 to oppose the centrifugal force acting on the oil remaining within the oil chamber 41.

The planetary gear-type reducing mechanism 14 of the forward and backward travel switch-over mechanism mounted at the right end of the driving shaft 6 includes a sun gear 45 spline-coupled to the driving shaft 6, a planetary carrier 46 having an inner periphery relatively rotatably carried on the driving shaft 6, a ring gear 48 formed on an outer periphery of a ring gear side-plate 47 having an inner periphery relatively rotatably carried on the driving shaft 6, and inner planetary gears 49 and outer planetary gears 50 which are carried on the planetary carrier 46. The inner planetary gears 49 and the outer planetary gears 50 are meshed with each other. The inner planetary gears 49 are meshed with the sun gear 45, and the outer planetary gears 50 are meshed with the ring gear 48.

The inner periphery of the planetary carrier 46 and the inner periphery of the ring gear side-plate 47 are supported through three thrust bearings 52, 53 and 54 between a right side of the sun gear 45 spline-coupled to the driving shaft 6 and a thrust washer 51 secured to the right end of the driving shaft 6. More specifically, the left side of the inner periphery of the planetary carrier 46 is superimposed on the right side of the sun gear 45 with the thrust bearing 52 interposed therebetween; the left side of the inner periphery of the ring gear side-plate 47 is superposed on the right side of the inner periphery of the planetary carrier 46 with the thrust bearing 53 interposed therebetween; and the left side of the thrust washer 51 is superimposed on the right side of the inner periphery of the ring gear side-plate 47 with the thrust bearing 54 interposed therebetween.

The forward clutch 15 of the forward and backward travel switch-over mechanism includes a clutch outer member 55 secured to the right end of the sleeve shaft 36 and coupled to the outer periphery of the planetary carrier 46, a clutch inner member 56 coupled to the sun gear 45, and a plurality of friction plates 57 disposed between the clutch outer member 55 and the clutch inner member 56. A clutch piston 58 is positioned in the clutch outer member 55 for urging the friction plates 57, and a spring 59 urges the clutch piston 58 back. If the oil is supplied to an oil chamber 60 defined between the clutch outer member 55 and the clutch piston 58 to drive the clutch piston 58, the friction plates 57 are brought into close contact with one another, whereby the clutch outer member 55 and the clutch inner member 56 are integrated, and the sleeve shaft 36 is coupled to the driving shaft 6, so that the driving pulley 13 is rotated in unison with the driving shaft 6.

The reverse brake 16 of the forward and backward travel switch-over mechanism, includes a plurality of friction plates 61 disposed between the outer periphery of the ring gear 48 and the inner periphery of the intermediate casing 3. A brake piston 62 is slidably supported on the intermediate casing 3 and for urging the friction plates 61. The springs 63 urge the brake piston 62 back. If the oil is supplied to an oil chamber 64 defined between the brake piston 62 and the intermediate casing 3 to drive the brake piston 62, the friction plates 61 are brought into close contact with one another, whereby the ring gear 48 is coupled to the intermediate casing 3. This causes the rotation of the driving shaft 6 to be transmitted through the sun gear 45, the inner planetary gears 49, the outer planetary gears 50 and the planetary carrier 46 to the clutch outer member 55. Thus, the rotation of the driving shaft 6 is reversed and transmitted to the driving pulley 13.

The ball bearing 10 supporting the driving shaft 6 and the sleeve shaft 36 is clamped between the intermediate casing 3 and a bearing holder 66 which is fixed by a bolt 65 passing through the intermediate casing 3. The head of the bolt 65 is disposed within the oil chamber 64 in the reverse brake 16, whereby the outside diameter of the brake piston 62 can be reduced to provide compactness of the reverse brake 16, as compared with the case where the oil chamber 64 is defined radially outside of the bolt 65.

The following oil passages are defined by two oil feed pipes coaxially fitted into the right end of the driving shaft 6: an oil passage 67 for feeding oil into the oil chamber 41 in the driving pulley 13; an oil passage 68 for feeding oil into the oil chamber 60 in the forward clutch 15; and an oil passage 69 for lubricating the forward clutch 15. The oil flowing from the oil passage 67 into the space between the driving shaft 6 and the sleeve shaft 36 is diverted to the left and right to flow along the outer periphery of the driving shaft 6 to lubricate the pair of needle bearings 34 and 35.

A pair of seal rings 70 and 71 are provided on the left side of the left needle bearing 35, and an intermediate position between both the seal rings 70 and 71 communicates with an oil passage 72 which is defined in the left end of the driving shaft 6. Therefore, a portion of the oil which has lubricated the left needle bearing 35 is passed through the right seal ring 70 and blocked by the left seal ring 71, and then flows into the oil passage 72 to lubricate the spline-coupled portion of the first oil pump driving gear 31.

The stationary pulley half 75 of the driven pulley 20 is integrally formed on the driven shaft 7, and the movable pulley half 76 is slidably carried on the outer periphery of the driven shaft 7 through a ball spline. An oil chamber 79 for urging the movable pulley half 76 toward the stationary pulley half 75 is defined by the following three components: a partition member 77 secured to the driven shaft 7; a partition member 78 secured to the movable pulley half 76; and the movable pulley half 76. A spring 80 is mounted under compression in the oil chamber 79, for applying a predetermined initial load to the endless belt 21. A canceler 81 is defined between the partition member 77 of the driven shaft 7 and the partition member 78 of the movable pulley half 76 and is opposed to the oil chamber 79 with the partition member 77 interposed therebetween.

The starting clutch 19 mounted at the left end of the driven shaft 7 includes a clutch outer member 82 secured to the driven shaft 7, a clutch inner member 84 relatively rotatably carried on the outer periphery of the driven shaft 7 with a pair of needle bearings 83, 83 interposed therebetween. A plurality of friction plates 85 are disposed between the clutch outer member 82 and the clutch inner member 84. A clutch piston 86 is positioned within the clutch outer member 82 for urging the friction plates 85, and a spring 87 urges the clutch piston 86 back. If oil is supplied into an oil chamber 88 defined between the clutch outer member 82 and the clutch piston 86 to drive the clutch piston 86, the friction plates 85 are brought into close contact with one another to couple the clutch outer member 82 and the clutch inner member 84 to each other, so that the clutch inner member 84 is rotated in unison with the driven shaft 7.

A parking gear 89 and an output gear 90 are integrally formed on the clutch inner member 84. A first intermediate gear 91 and a second intermediate gear 92 are integrally formed on the secondary shaft 8. The first intermediate gear 91 is meshed with the output gear 90, and the second intermediate gear 92 is meshed with a final gear 93 of the differential 9.

A belt-type continuously variable transmission having the above-described structure is capable of transmitting the rotation of the crankshaft 5 of the engine through a path of the flywheel 12→the forward clutch 15→the sleeve shaft 36→the driving pulley 13→the endless belt 21→the driven pulley 20→the driven shaft 7→the starting clutch 19→the output gear 90→the first intermediate gear 91→the second intermediate gear 92→the final gear 93→the differential 9 to drive left and right axles in a normal rotation to thereby drive the vehicle forwards by bringing the forward clutch 15 of the forward and backward travel switch-over mechanism into an engaged state to directly couple the sleeve shaft 36 carrying the driving pulley 13 to the driving shaft 6 and bringing the starting clutch 19 into an engaged state to couple the output shaft 90 to the driven shaft 7.

If the reverse brake 16 is brought into an engaged state in place of the forward clutch 15, the rotation of the driving shaft 6 is decelerated as described above and transmitted in the form of reverse rotation, whereby the left and right axles are driven in reverse rotation to drive the vehicle backwards.

When the vehicle is driven forwards or backwards in the above manner, the groove width of one of the driving pulley 13 and the driven pulley 20 can be increased and the groove width of the other can be decreased to continuously vary the shift ratio of the driving force transmitted from the driving shaft 6 to the driven shaft 7, by providing a difference between the hydraulic pressure applied to the oil chamber 41 in the driving pulley 13 and the hydraulic pressure applied to the oil chamber 79 in the driven pulley 20.

In a belt-type continuously variable transmission having the above-described arrangement, the inclination angle of V-grooves in the driving pulley 13 and the driven pulley 20 (the angle which is formed by the plane of rotation of the pulley and the pulley/belt contact surface and which will be referred to as a pulley inclination angle $\alpha$ hereinafter) is set at 8° in the preferred embodiment. The reason will be described below.

Figure 8:
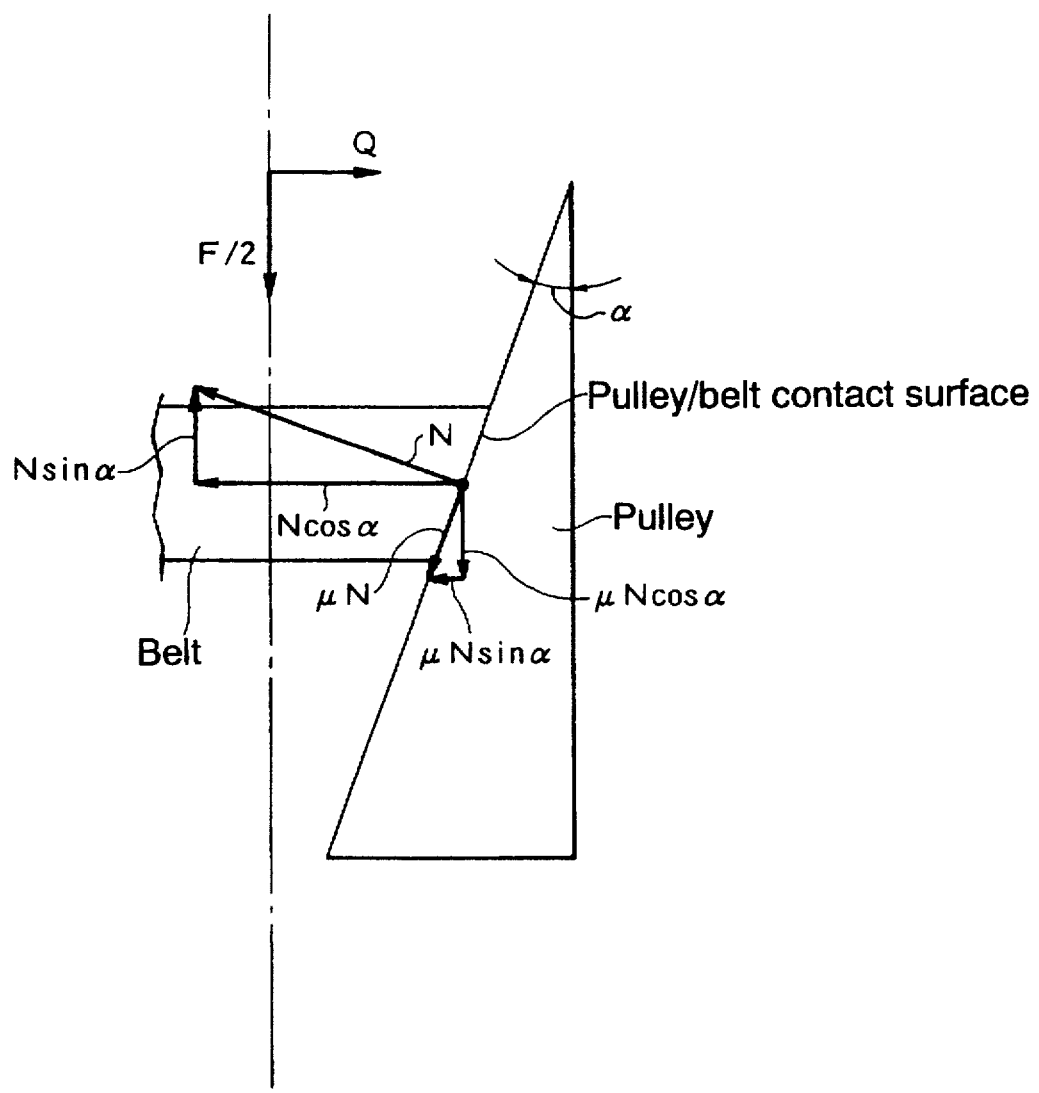
FIG. 8 is an illustration for explaining the balance of forces applied to an endless belt.

FIG. 8 is an illustration for explaining the balance of a force applied to the endless belt 21.

$\alpha$: Pulley inclination angle $\mu$: Friction coefficient between the pulley and the endless belt N: Vertical drag received by the endless belt from the pulley F: Urging force permitting the endless belt to be urged against the center of the pulley by its tensile force Q: Axial thrust force of the pulley generated by hydraulic pressure wherein each of N, F and Q is a value per unit angle of the pulley.

A friction force $\mu N$ depending upon the vertical drag N and the friction coefficient $\mu$, is applied between the pulley and the endless belt. The friction force is directed radially inwards as shown, when the endless belt is intended to move radially outwards of the pulley, and the friction force is directed radially outwards, when the endless belt is intended to move radially inwards of the pulley.

An axial load received by the endless belt from the pulley is represented by $N \cos \alpha + \mu N \sin \alpha$, and is balanced with an axial thrust force Q of the pulley generated by the hydraulic pressure.

$$Q = N \cos \alpha + \mu N \sin \alpha \quad (1)$$

A radial load received by the endless belt from the pulley is represented by $N \sin \alpha + \mu N \cos \alpha$ and is balanced with one half F/2 of the urging force F provided by the tensile force of the endless belt (the sum total of the radial loads received by the left and right opposite end faces of the endless belt from the pulley is balanced with the urging force F).

$$F/2 = N \sin \alpha + \mu N \cos \alpha \quad (2)$$

Here, a necessary condition for moving the endless belt radially outwards upon generation of the axial thrust force Q is that when Q is a positive value, F is a positive value. In other words, it is required that the friction coefficient $\mu$ and the pulley inclination angle $\alpha$ satisfy the following relationship:

If the equation (1) is solved for N and replaced into the equation (2), the following equation (3) is provided:

$$F/2 = Q(\sin \alpha - \mu \cos \alpha)/(\cos \alpha + \mu \sin \alpha) \quad (3)$$

wherein Q is a positive value and $0° < \alpha < 90°$ and hence, $\cos \alpha + \mu \sin \alpha$ also assumes a positive value. Eventually, to ensure that F is a positive value, the following expression need only be satisfied:

$$\sin \alpha - \mu \cos \alpha > 0 \quad (4)$$

Thus, $$\tan \alpha > \mu \quad (5)$$

is provided from the expression (4).

The expression (5) means that in order to move the endless belt radially outwards by biasing the movable pulley half relative to the stationary pulley half by the hydraulic pressure, it is necessary to satisfy the condition of $\tan \alpha > \mu$. Namely, if the pulley inclination angle $\alpha$ is larger, a force for urging the endless belt into a wedge-like shape radially outwards of the pulley by the axial thrust force provided by the hydraulic pressure must overcome the friction force between the endless belt and the pulley and hence, the endless belt can be moved radially outwards. However, when the pulley inclination angle $\alpha$ is smaller, a force for urging the endless belt into a wedge-like shape radially outwards by the axial thrust force provided by the hydraulic pressure is also smaller and hence, cannot overcome the friction force between the endless belt and the pulley to move the endless belt radially outwards.

The friction coefficient $\mu$ between the pulley and the endless belt includes a static friction coefficient $\mu s$ and a dynamic friction coefficient $\mu a$. The static friction coefficient $\mu s$ has a value larger than the dynamic friction coefficient $\mu a$ ($\mu s > \mu a$). Therefore, in order to move the endless belt radially outwards by hydraulic pressure during stoppage of the pulley, it is necessary to satisfy the following expression (6):

$$\tan \alpha > \mu s \quad (6)$$

and for this purpose, it is necessary to increase the pulley inclination angle $\alpha$. In order to move the endless belt radially outwards by hydraulic pressure during rotation of the pulley, it is necessary to satisfy the following expression (7):

$$\tan \alpha > \mu a \quad (7)$$

and the pulley inclination angle $\alpha$ for this purpose may be small.

When the vehicle has been suddenly braked to stop the rotation of driven wheels in a state in which the ratio of the belt-type continuously variable transmission is not low, it is necessary to return the ratio to a low value to provide for the next start. In this case, if the belt-type continuously variable transmission does not have the starting clutch 19 on the driven shaft 7, but has the starting clutch 19 on the driving shaft 6, the driving pulley 13 and the driven pulley 20 of the belt-type continuously variable transmission are not rotated during stoppage of the vehicle with the starting clutch 19 being in its disengaged state. For this reason, unless the pulley inclination angle $\alpha$ is set at a large value to satisfy the relation, $\tan \alpha > \mu s$, an extremely large hydraulic pressure is required for moving the endless belt 21 radially outwards of the driven pulley 20 to return the ratio to the low value.

However, the starting clutch 19 is provided on the driven shaft 7 in the present invention and therefore, even during stoppage of the vehicle with the starting clutch 19 being in its disengaged state, the driving pulley 13 and the driven pulley 20 of the belt-type continuously variable transmission are being rotated. Thus, even if the pulley inclination angle $\alpha$ is set at a small value to satisfy the relation, $\tan \alpha > \mu a$, the endless belt 21 can be moved radially outwards on the driven pulley 20 by a small hydraulic pressure, to return the ratio to the low value.

Moreover, to return the ratio to the low value in a state in which the driving pulley 13 and the driven pulley 20 have been stopped, a hydraulic pressure of about 4-times larger than the hydraulic pressure applied to the oil chamber 41 in the driving pulley 13 needs be applied to the oil chamber 79 in the driven pulley 20, but to return the ratio to the low value in a state in which the driving pulley 13 and the driven pulley 20 are being rotated, a hydraulic pressure of about 2-times larger than the hydraulic pressure applied to the oil chamber 41 is sufficient.

By the provision of the starting clutch 19 on the driven shaft 7, the shifting can be easily performed in the state in which the driving pulley 13 and the driven pulley 20 are being rotated. Therefore, it is not required that the pulley inclination angle $\alpha$ satisfies the relation, $\tan \alpha > \mu s$ as in the prior art, and it is possible to use a pulley inclination angle $\alpha$ which cannot be used in the prior art, namely, an inclination angle $\alpha$ satisfying the following relation:

$$\mu a < \tan \alpha < \mu s \quad (8)$$

In other words, if the starting clutch 19 is provided on the driven shaft 7, the shifting can be performed even if the pulley inclination angle $\alpha$ is set at a value smaller than a conventional value.

When the static friction coefficient $\mu s$ is set at 0.17 and the dynamic friction coefficient $\mu a$ is set at 0.08 based on experimental values, a pulley inclination angle $\alpha$ satisfying the expression (8) in the following range:

$$4.57° < \alpha < 9.65° \quad (9)$$

In the conventional belt-type continuous transmission having the starting clutch 19 on the driving shaft 6, the pulley inclination angle $\alpha$ is set at 11° for the above-described reason, whereas in the belt-type continuously variable transmission according to the present embodiment, the pulley inclination angle α is set at 8° which is within the range represented by the expression (9).

If the pulley inclination angle α is set at the small value as described above, the transmittable torque of the belt-type continuously variable transmission can be increased while preventing slipping between the pulley and the endless belt. This is because when the pulley inclination angle α is set at the small value, the urging force F of the endless belt (the tensile force T of the endless belt) is substantially decreased relative to the same axial thrust force, while the vertical drag N received from the pulley is varied only slightly. Hence, the vertical drag N received from the pulley can be increased while maintaining the urging force F (the tensile force T) of the endless belt in a range ensuring that the endless belt does not slip, thereby providing an increase in transmittable torque. The reason will be described below in further detail.

If F/Q is calculated in the equation (3) when the friction coefficient μr (a component of the dynamic friction coefficient μa in a radial direction of the pulley) is set at 0.07 in the case where the pulley inclination angle α is equal to 11° and in the case where the pulley inclination angle α is equal to 8°, F/Q is equal 0.25 in the case of α=11°, and equal to 0.14 in the case of α=8°. Herein, the influence of a centrifugal force is disregarded.

Thus, if the axial thrust force Q of the pulley generated by the hydraulic pressure is defined at 1000 kgf, an urging force F permitting the endless belt to be urged against the pulley by its tensile force (which will be referred to as a belt urging force F hereinafter) is equal to 250 kgf in the case of α=11°, and 140 kgf in the case of α=8°.

Figure 9:
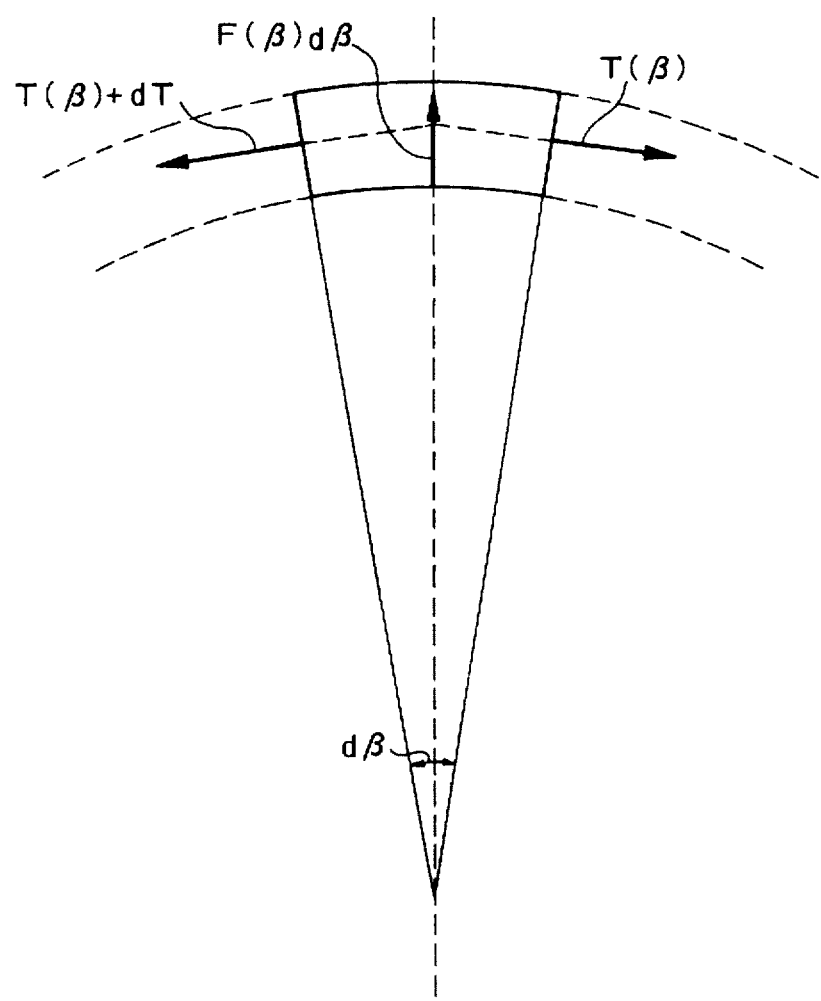
FIG. 9 is an illustration for explaining the relationship between the urging force and the tensile force of the endless belt.

If the balance of the radial force applied to a very small area (an area having the center angle dβ) of the endless belt reeved around the pulley with a tensile force T as shown in FIG. 9 is considered, the following equation is established:

$$T(\beta) \sin (d\beta/2) + \{T(\beta)+dT\} \sin (d\beta/2) = F(\beta)d\beta \quad (10)$$

dβ is a very small angle, so in the case of sin (dβ/2)=dβ/2, the equation (10) is changed to:

$$T(\beta)=F(\beta) \quad (11)$$

Namely, the above equation indicates that the belt urging force F is equal to the tensile force T of the endless belt. This indicates that when the tensile force T of the endless belt (belt urging force F) is the same, the axial thrust force Q of the pulley can assume a larger value as the pulley inclination angle α is smaller and hence, the transmittable torque Tin can assume a larger value.

Figure 10A:
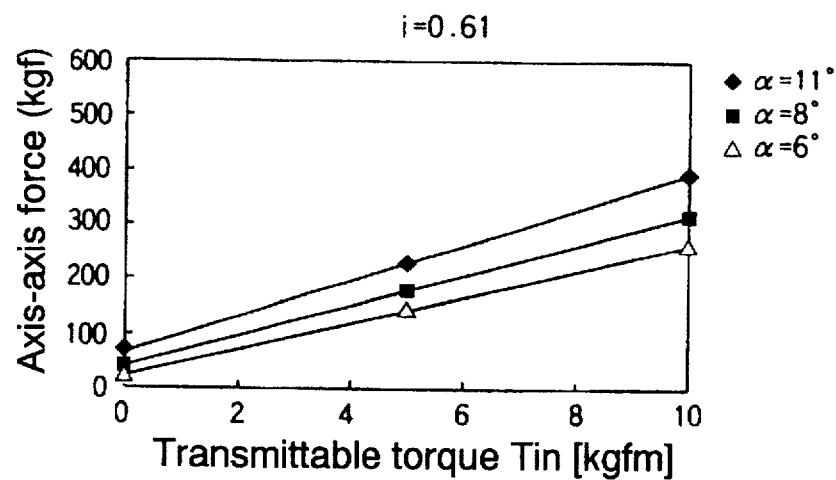
FIGS. 10A–10C are graphs illustrating the relationship between the transmittable torque and the axis-axis force.
Figure 10B:
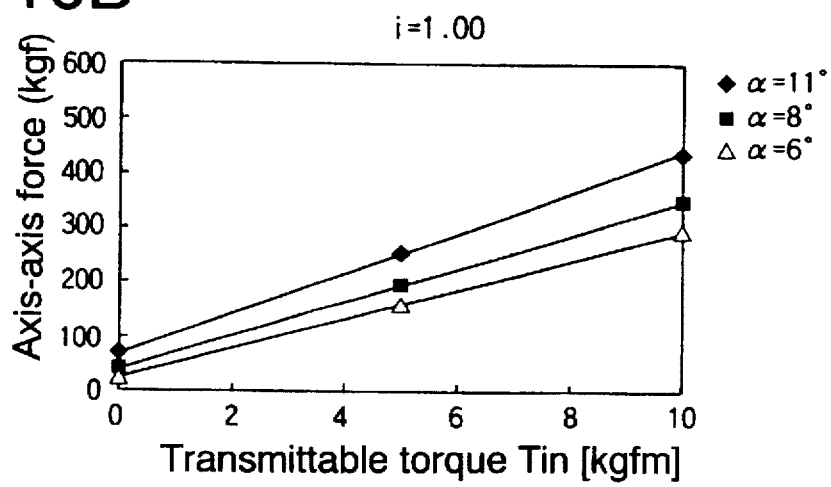
Figure 10C:
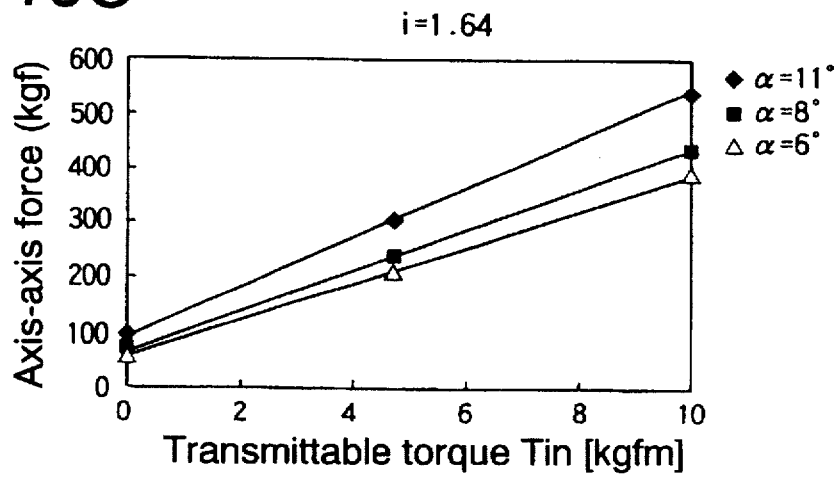

This is evident even from the graphs shown in FIGS. 10A–10C in which the transmittable torque Tin of the belt-type continuously variable transmission is taken on the axis of the abscissas and the belt urging force F which is in a positive correlation to the tensile force T of the endless belt is taken on the axis of the ordinates. It can be seen that in any of the cases where the ratio i (speed of revolution of the driving shaft/speed of revolution of the driven shaft) is of 0.61, 1.00 and 1.64, the transmittable torque Tin is increased with respect to the same axis-axis force (the tensile force T), as the pulley inclination angle is smaller.

Figure 11:
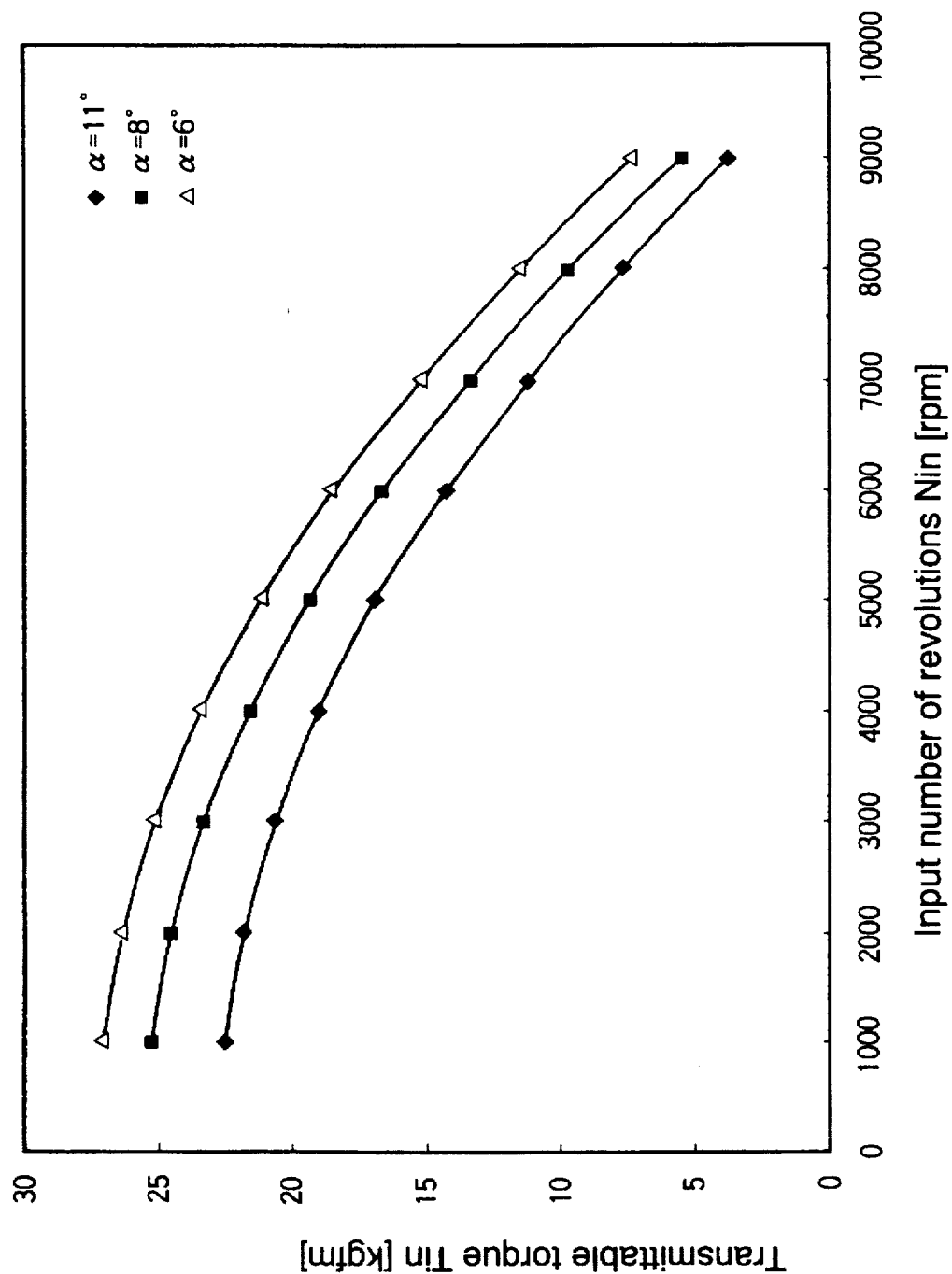
FIG. 11 is a graph illustrating the relationship between the input number of revolutions per minute and the transmittable torque.

A graph in FIG. 11 shows the variation in transmittable torque Tin with respect to the input speed of revolution (the speed of revolution of the driving shaft) Nin for different pulley inclination angles α, and it can be seen from the graph in FIG. 11 that as the pulley inclination angle α is decreased in all ranges of the speed of revolution, the transmittable torque Tin is increased.

Figure 12:
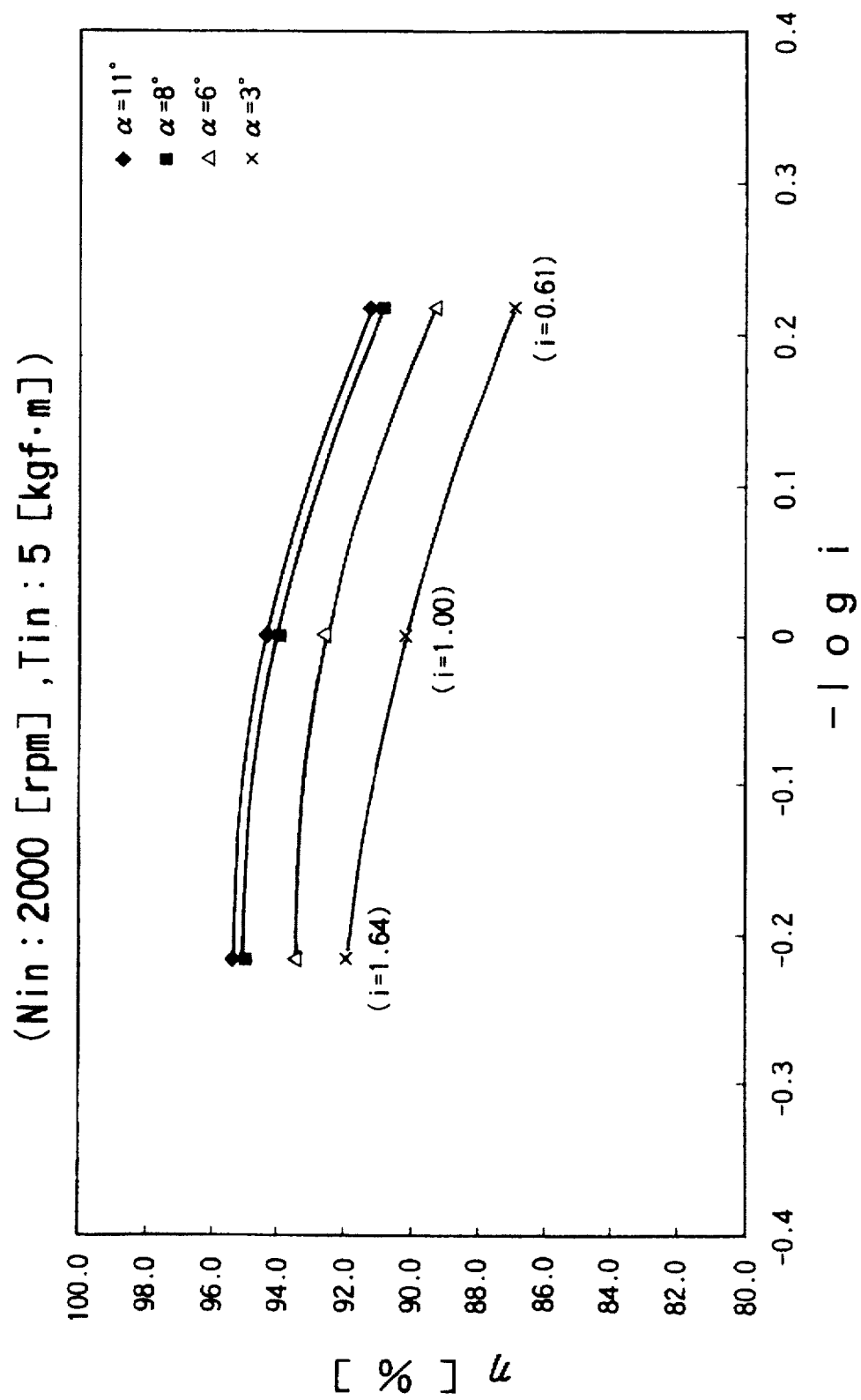
FIGS. 12 and 13 are graphs illustrating the relationship between the ratio and the transmitting efficiency.
Figure 13:
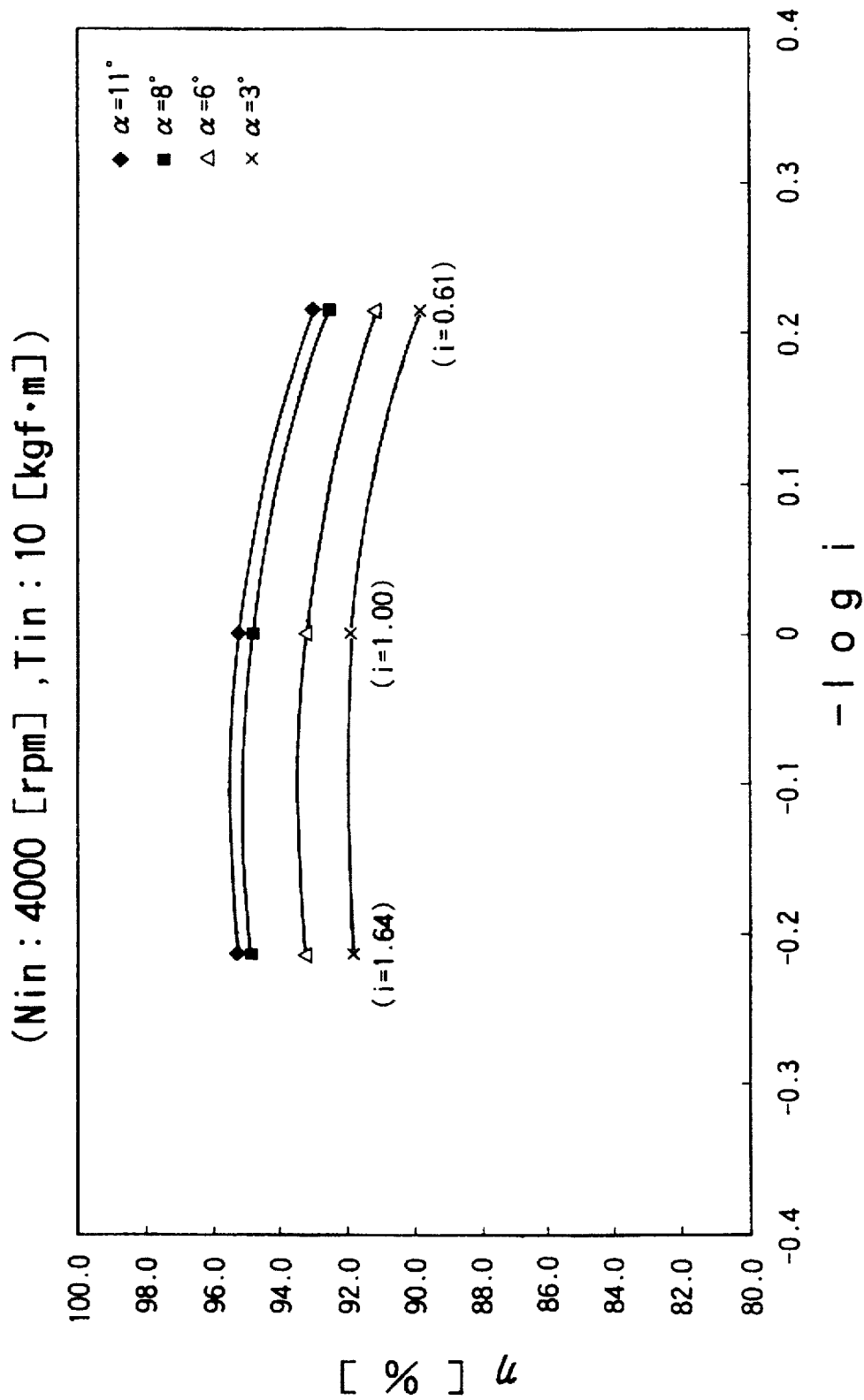

FIGS. 12 and 13 show the variation in transmitting efficiency η with respect to the ratio i for different pulley inclination angles α, FIG. 12 corresponding to the case where the input speed of revolution Nin is of 2000 rpm and the transmittable torque Tin is of 5 kgfm, and FIG. 13 corresponding to the case where the input speed of revolution Nin is of 4000 rpm and the transmittable torque Tin is of 10 kgfm. As apparent from these graphs, as the pulley inclination angle α is decreased, the transmitting efficiency η is reduced, but in a range of 4.57°<α<9.65° as shown in FIG. 9, the reduction in transmitting efficiency η is slight, which provides no hindrance for practical use.

From the foregoing, it is desirable that the pulley inclination angle α permitting the transmittable torque Tin to be effectively increased while suppressing the reduction in transmitting efficiency η to the minimum is set in a range of 5°<α<9° expecting errors during manufacturing, and in the present embodiment, such pulley inclination angle α is set at 8°.

By the fact that the starting clutch 19 is provided on the driven shaft 7, as describe above, the pulley inclination angle α can be set at a small value falling within a range of μa<tan α<μs. Thus, the strength and sectional area of the material for the metal rings $21_1$, $21_1$ of the endless belt 21 can be increased, and the increase in axis-axis distance between the driving shaft 6 and the driven shaft 7 can be accepted to increase the diameters of the driving pulley 13 and the driven pulley 20. Thus, the axial thrust force Q of the driving pulley 13 and the driven pulley 20 can be increased while avoiding an increase in tensile force T of the endless belt 21 without reducing the flexing stress of the metal rings $21_1$, $21_1$, thereby increasing the transmittable torque Tin without slipping of the endless belt 21.

In addition, the stroke of the pulley with respect to the same variation in ratio is reduced by decreasing the pulley inclination angle α and therefore, the axial dimension of the belt-type continuously variable transmission can be reduced in cooperation with the fact that the axial thickness of the pulley itself is decreased. Further, if the transmittable torque Tin is constant, the amounts of oil drawn and discharged with respect to the same shift amount can be decreased and therefore, the responsiveness to the variation in ratio can be enhanced and moreover, the capacity of the oil pump 32 can be decreased to reduce the size of the belt-type continuously variable transmission to thereby provide an enhancement in efficiency by a reduction in load of the oil pump.

Figure 14:
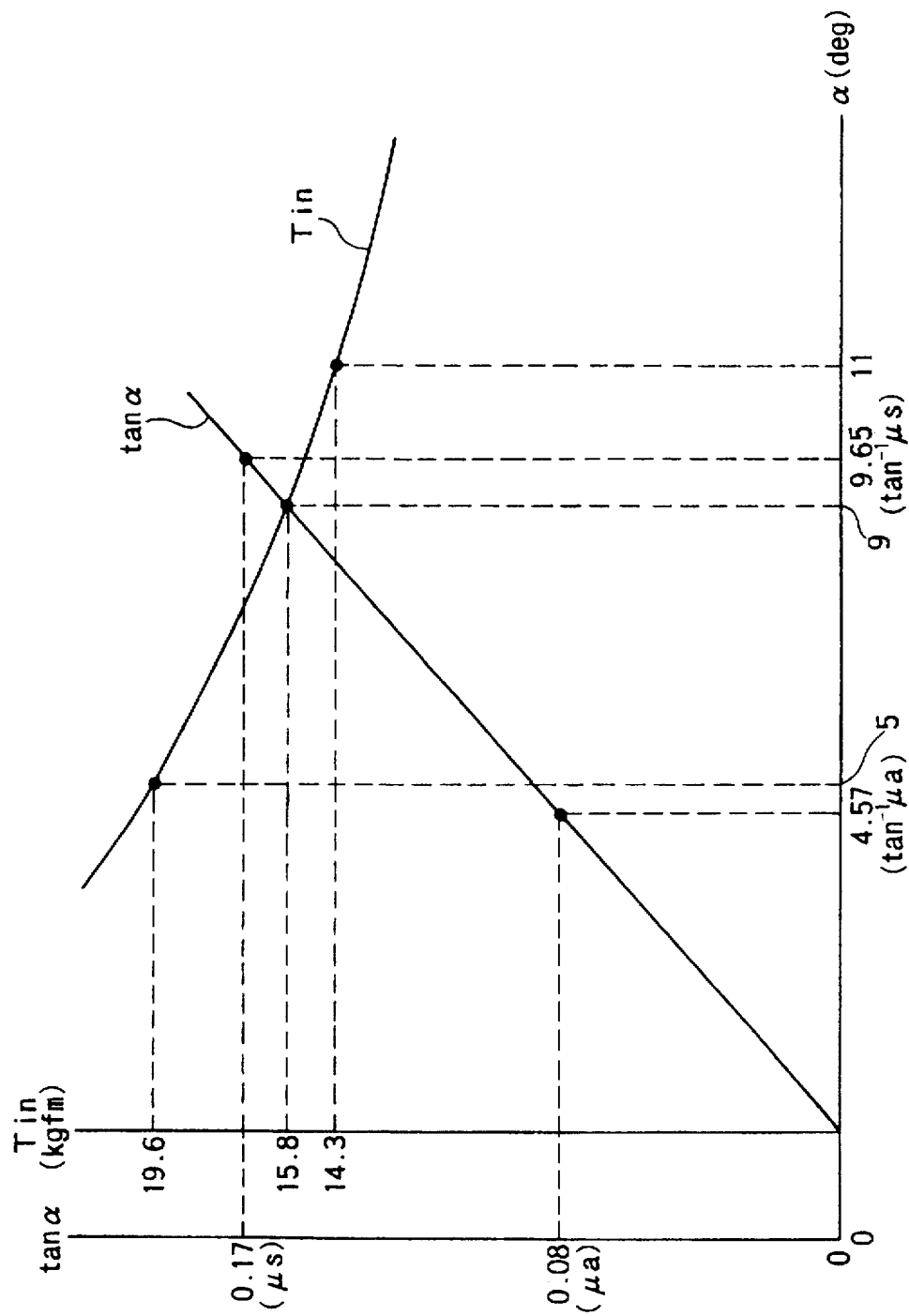
FIG. 14 is a graph illustrating the relationship between the pulley inclination angle and the transmittable torque.

FIG. 14 shows the variation in transmittable torque Tin when the pulley inclination angle α is varied. It can be seen from FIG. 14 that when α=11°, Tin=14.3, whereas when α=9°, the transmittable torque Tin is increased to 15.8, and when α=5°, the transmittable torque Tin is increased to 19.6.

The belt-type continuous transmission for a vehicle has been illustrated in the preferred embodiment, but the present invention is applicable to a belt-type continuously variable transmission for another application such as a machine tool and the like. In addition, the starting clutch 19 has been provided on the driven shaft 7 in the embodiment, but a shifting clutch may be provided on the driven shaft 7, and the starting clutch 19 may be provided on the driving shaft 6. The present invention is also applicable to a belt-type continuously variable transmission with a torque converter.

Although the embodiment of the present invention has been described in detail, it will be understood that the present invention is not limited to the above-described embodiment, and various modifications may be made without departing from the spirit and scope of the invention defined in claims.

What is claimed is:

1. A metal V-belt type continuously variable transmission comprising:
   (a) a driving shaft;
   (b) a driving pulley mounted on said driving shaft, said driving pulley having a V-groove therein;
   (c) a driven shaft;
   (d) a driven pulley mounted on said driven shaft, said driven pulley having a V-groove therein;
   (e) an endless belt reeved around said driving pulley and said driven pulley, and positioned in said V-groove therein, wherein the inclination angle $\alpha$ of said V-groove in said driving pulley and said driven pulley is in the range $\tan^{-1} \mu a < \alpha < \tan^{-1} \mu s$, where $\mu s$ is the static friction coefficient between said driving and driven pulley and said endless belt, and $\mu a$ is the dynamic friction coefficient between said driving and driven pulley and said endless belt.

2. A metal V-belt type continuously variable transmission as set forth in claim 1, wherein $4.57° < \alpha < 9.65°$.

3. A metal V-belt type continuously variable transmission as set forth in claim 1 including:
   (a) a clutch; and
   (b) a follower member wherein said clutch operatively couples said follower member to said driven shaft.

4. A metal V-belt type continuously variable transmission as set forth in claim 3, wherein said clutch is a starting clutch.

5. A metal V-belt type continuously variable transmission as set forth in claim 1, wherein said V-belt comprises at least one metal ring reeved around said driving and driven pulleys and a plurality of metal blocks mounted on said at least one metal ring.

* * * * *

UNITED STATES PATENT AND TRADEMARK OFFICE
CERTIFICATE OF CORRECTION

PATENT NO. : 5,800,298                     Page 1 of 2
DATED     : September 1, 1998
INVENTOR(S) : Shigeru Kanehara, et al It is certified that error appears in the above-identified patent and that said Letters Patent is hereby corrected as shown below:

On the title page, under Item [56], "OTHER PUBLICATIONS" the following should appear:

-- "Design Study of Steel V-belt CVT for Electric Vehicles", SWAIN et al, study prepared for National Aeronautics and Space Administration and U.S. Department of Energy, June 1980, pgs. 1 - 122.

**"Aspects of a Metal Pushing V-belt for Automotive CVT Application", HENRIKS et al, *SAE Technical Papers Series*, October 31 - November 3, 1988, pgs. 1 - 11.**

**"Taschenbuch für den Maschinenbau", BEITZ et al, *Dubbel*, pgs. B15 - B16, along with an English translation of the relevant portions thereof. --**

On the title page, under item [56], insert the following:

UNITED STATES PATENT AND TRADEMARK OFFICE
CERTIFICATE OF CORRECTION

PATENT NO.  : 5,800,298
DATED       : September 1, 1998
INVENTOR(S) : Shigeru Kanehara, et al It is certified that error appears in the above-identified patent and that said Letters Patent is hereby corrected as shown below:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 5 | 3 | 2 | 8 | 4 | 1 | 2 | 07/19974 | DURUM | | | |
| | | 4 | 9 | 4 | 1 | 8 | 6 | 3 | 07/1990 | SAMPEI ET AL | | | |
| | | 4 | 8 | 1 | 0 | 2 | 3 | 7 | 03/1989 | MANTOVAARA | | | |
| | | 4 | 6 | 7 | 3 | 3 | 7 | 9 | 06/1987 | OHZONO ET AL | | | |
| | | 4 | 3 | 8 | 0 | 4 | 4 | 4 | 04/1983 | DOLZA | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | 4 | 1 | 6 | 5 | 1 | 4 | 9 | 06/1992 | JAPAN | | | | |
| | | 0 | 0 | 0 | 0 | 8 | 0 | 2 | 02/1979 | EUROPEAN | | | | |
| | | 5 | 1 | 9 | 6 | 0 | 9 | 3 | 08/1993 | JAPAN | | | | |
| | | 0 | 4 | 8 | 3 | 7 | 6 | 4 | 05/1992 | EUROPEAN | | | | |

Signed and Sealed this

Second Day of March, 1999

Attest:

Attesting Officer

Q. TODD DICKINSON

Acting Commissioner of Patents and Trademarks